US010398182B1

(12) United States Patent
Kentos

(10) Patent No.: US 10,398,182 B1
(45) Date of Patent: Sep. 3, 2019

(54) GARMENT LIGHTING SYSTEM

(71) Applicant: Martin Kentos, Las Vegas, NV (US)

(72) Inventor: Martin Kentos, Las Vegas, NV (US)

( * ) Notice: Subject to any disclaimer, the term of this patent is extended or adjusted under 35 U.S.C. 154(b) by 0 days.

(21) Appl. No.: 15/938,673

(22) Filed: Mar. 28, 2018

Related U.S. Application Data

(60) Provisional application No. 62/481,205, filed on Apr. 4, 2017.

(51) Int. Cl.
| | | |
|---|---|---|
| *A41D 27/00* | (2006.01) | |
| *A41D 27/08* | (2006.01) | |
| *F21V 33/00* | (2006.01) | |
| *F21V 8/00* | (2006.01) | |
| *A41D 1/04* | (2006.01) | |
| *A41D 1/00* | (2018.01) | |
| *A41B 1/08* | (2006.01) | |
| *F21W 121/06* | (2006.01) | |

(52) U.S. Cl.
CPC ............. *A41D 27/085* (2013.01); *A41B 1/08* (2013.01); *A41D 1/002* (2013.01); *A41D 1/04* (2013.01); *F21V 33/0008* (2013.01); *G02B 6/001* (2013.01); *F21W 2121/06* (2013.01)

(58) Field of Classification Search
CPC ........ A41D 27/085; A41D 1/002; A41B 1/08; F21V 33/0008; F21W 2121/06
USPC ....................................................... 362/570
See application file for complete search history.

(56) References Cited

U.S. PATENT DOCUMENTS

| | | | |
|---|---|---|---|
| 4,234,907 A | | 11/1980 | Daniel |
| 4,727,603 A | | 3/1988 | Howard |
| 4,875,144 A | | 10/1989 | Wainwright |
| 5,588,156 A | * | 12/1996 | Panton, Jr. ............. A41D 13/01 2/115 |
| 5,803,266 A | * | 9/1998 | Blackwelder ............ A42B 1/24 2/209.13 |
| 5,906,004 A | | 5/1999 | Lebby et al. |
| 8,516,724 B2 | | 8/2013 | Diepenbrock et al. |
| 9,470,411 B1 | * | 10/2016 | Ramsey ................... A41B 9/00 |
| 9,743,696 B1 | * | 8/2017 | Ramsey ............... A41D 27/085 |
| 2003/0115656 A1 | | 6/2003 | Leblang |
| 2005/0111210 A1 | | 5/2005 | Ono |
| 2005/0120458 A1 | * | 6/2005 | Clark .................... A41D 27/085 2/69 |
| 2005/0125874 A1 | | 6/2005 | DeVore |
| 2007/0056074 A1 | * | 3/2007 | Esses ...................... A41D 1/04 2/69 |
| 2008/0198578 A1 | * | 8/2008 | Finn ........................ A41B 9/04 362/103 |
| 2009/0251077 A1 | * | 10/2009 | Wilborn ............... A41D 27/085 315/313 |
| 2010/0277944 A1 | * | 11/2010 | Hurwitz .................. A41D 27/08 362/570 |
| 2013/0077289 A1 | * | 3/2013 | Gridley ............... A41D 27/085 362/103 |
| 2014/0347845 A1 | * | 11/2014 | Pulido, Jr. .............. A43B 3/001 362/103 |
| 2015/0305414 A1 | * | 10/2015 | Garbrick ................ A41D 13/01 362/570 |

(Continued)

*Primary Examiner* — Gerald J Sufleta, II
(74) *Attorney, Agent, or Firm* — Barry Choobin; Patent 360

(57) ABSTRACT

A light emitting garment system including a light source and a design. The light source may be positioned relative to the design such that the light source is activatable to produce a visual effect via or through the design.

15 Claims, 5 Drawing Sheets

(56) References Cited

U.S. PATENT DOCUMENTS

2017/0094749 A1* 3/2017 Elsherbini ................ A41B 1/08
2018/0098580 A1* 4/2018 Castellano ............. A41D 1/005

* cited by examiner

GARMENT LIGHTING SYSTEM

CROSS-REFERENCE TO RELATED APPLICATION

This application claims the benefit of U.S. Provisional Patent Application Ser. No. 62/481,205, filed Apr. 4, 2017, which is incorporated herein in its entirety.

FIELD OF THE INVENTION

The present invention relates generally to lighted garment systems and more particularly to a garment lighting system configured to illuminate a design in a garment.

BACKGROUND OF THE INVENTION

It is common for individuals to wear garments such as t-shirts, pants, and jackets that display various visual designs, logos, or fashionable patterns. Further, light emitting garments exist such as glow-in-the-dark and fiber-optic garments, that individuals may choose to wear at night to draw attention or to enhance their presence.

Therefore, the garment market will appreciate novel configurations of light emitting garment systems, especially systems that may enhance or add value to visual designs and patterns on garments.

SUMMARY OF THE INVENTION

The present invention is directed to a light emitting garment system, the system comprising, a light source, and a design, wherein the light source is positioned relative to the design such that the light source is activatable to produce a visual effect via the design.

In another aspect, the light source is disposed on a fabric layer and is switchable on and off via a switch.

In another aspect, the light source is a fiber optic fabric.

In another aspect, the design is disposed on a fabric layer.

In another aspect, the light source is part of a light source layer, the design is part of a design layer, and the design layer is disposable between the light source layer and a viewer such that a visual effect is observed through the design layer when the light source layer is activated.

In another aspect, the design has a first visibility to a viewer when the light source is off, and the design has a second visibility when the light source is turned on, where the second visibility is different from the first visibility.

In another aspect, the light source layer is separate from the design layer such that different design layers may be used for a single light source layer.

In another aspect, the light source layer includes fiber optic elements intermittently dispersed across an entire surface of a garment.

In another aspect, the design is part of a first design layer, and the system further includes a second design layer, where the light source is disposed between the first design layer and the second design layer such that each design layer can be selectively shown to a viewer.

In another aspect, the design is part of a first design surface, and the system further includes a second design surface, opposite the first design surface, where the light source is disposed between the first design surface and the second design surface such that each design surface can be selectively shown to a viewer.

In another aspect, the system includes one or more selectively transparent surfaces disposable between a viewer and the design surface such that when the light source is deactivated the design is visible through the one or more selectively transparent surfaces in a first visibility, and when the light source is activated the design is visible through the one or more selectively transparent surfaces in a second visibility, where the first visibility is less than the second visibility.

In another aspect, the light source is sandwiched between a first and second design layer, and a selectively transparent layer is disposed on an outer surface of each of the design layers.

In another aspect, the light source is electrically coupled to a power supply for powering the light source, and coupled to a switch for activating or deactivating the light source.

In another aspect, a transparent material is positioned in the design layer for displaying a design visible behind the transparent material.

In another aspect, the design layer includes a first design on one surface of the design layer, and a second design on an opposite surface of the design layer, and a light source is positioned at each surfaces of the design layer for illuminating each of the first design and the second design.

In another aspect, the layers are optical layers having different optical attributes.

In another aspect, the light source and design are both fixed to a garment such that the design is visible through the light source.

In another aspect, the light source and design are fixed to a garment such that the light source is visible through the design.

In another aspect, the light source is fixed to a first garment, and the design is fixed to a second garment, where the first garment and the second garment are separable such that a third garment having a different design from the design of the second garment is illuminable by the light source of the first garment.

In another aspect, the light source and design are both fixed to a garment such that the garment is invertible to, while the garment is worn by a wearer, select the light source being outwardly placed with respect to the design, and to select the design being outwardly placed with respect to the light source.

In another aspect, the light source is included in a light source layer.

In another aspect, the design is included in a design layer that is configured to display the design to a viewer.

In another aspect, the light source is a first light source included in a first light source layer, and the system further includes a second light source in a second light source layer, where the design is located between the first light source layer and the second light source layer.

In another aspect, the design is a first design included in a first design layer, and the system further includes a second design in a second design layer, where the light source is located between the first design layer and the second design layer.

In another aspect, the light source is part of a light source layer, the design is part of a design layer, and the design layer is disposable between the light source layer and a viewer such that a visual effect is observed through the design layer when the light source layer is activated.

In another aspect, the design is part of a design layer, the light source is part of a light source layer, and the light source layer is disposable between the design layer and a viewer such that a visual effect is observed through the light source layer reflecting off the design layer when the light source layer is activated.

In another aspect, the light source is one of a plurality of fiber optic elements intermittently dispersed across an entire surface of a light source layer of a garment.

In another aspect, the design is part of a first design layer of a garment, and the system further includes a second design layer of the garment, where the light source is disposed between the first design layer and the second design layer such that each design layer can be selectively outwardly disposed to a viewer by inverting the garment.

In another aspect, the light source is part of a first light source layer of a garment, and the system further includes a second light source layer of the garment, where the design is disposed between the first light source layer and the second light source layer such that each light source layer can be selectively outwardly disposed toward a viewer by inverting the garment.

In another aspect, the system includes one or more selectively transparent surfaces disposable between a viewer and the design such that when the light source is deactivated the design is visible through the one or more selectively transparent surfaces in a first visibility, and when the light source is activated the design is visible through the one or more selectively transparent surfaces in a second visibility, where the first visibility is less than the second visibility.

In another aspect, the light source is sandwiched between a first design layer having a first design and a second design layer having a second design, the first design layer, the light source, and the second design layer being part of a garment, and a selectively transparent layer is disposed on a surface of at least one of the first design layer and the second design layer, such that, while the garment is worn by a wearer a design of at least one of the first design layer and the second design layer is less visible through the selectively transparent layer to an outside viewer when the light source is off and more visible through the selectively transparent layer to an outside viewer when the light source is on.

In another aspect, the design is part of a design layer including a first design on one surface of the design layer, and a second design on an opposite surface of the design layer, and a light source is positioned at each surface of the design layer for illuminating each of the first design and the second design.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
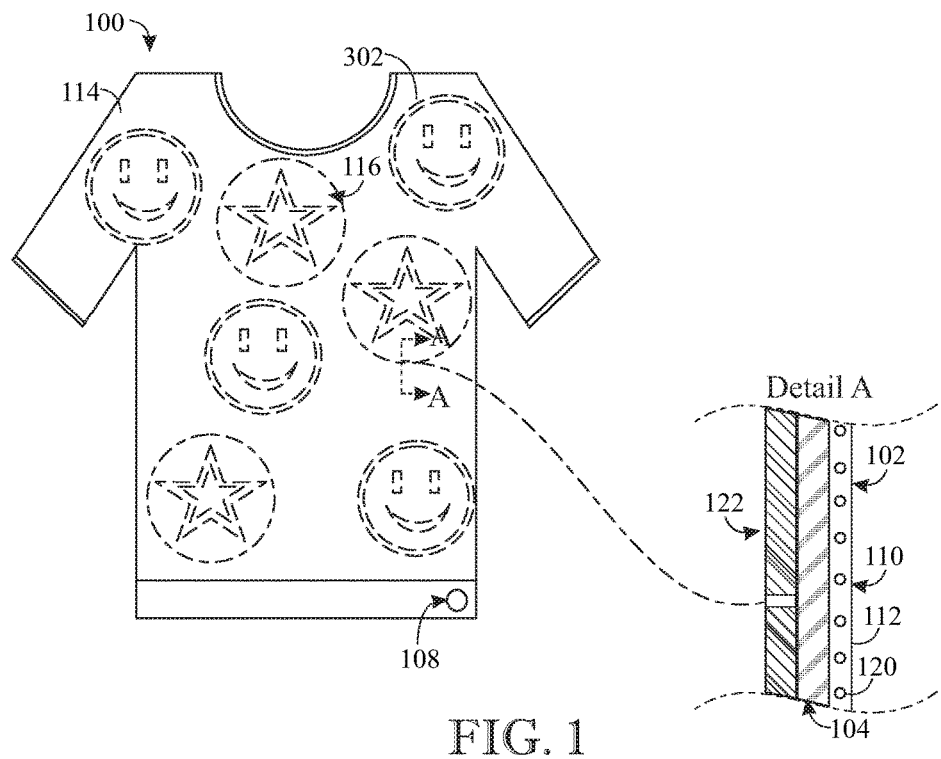
FIG. 1 presents a garment lighting system and a partial cross sectional view along cross sectional line A-A of FIG. 1, in accordance with aspects of the present disclosure.

Disclosed is a light emitting garment system 100. As shown in FIG. 1, the system may include a light source 102 and a design 104. The light source 102 may be positioned relative to the design 104 such that the light source 102 may be switchable on and off to produce a visual effect 106 via or through the design 104. The light source 102 may be disposed on a fabric, or fabric-type layer and may be switched on and off via a switch 108. The light source 102 may be or may include a fiber optic fabric 110, and the design 104 may be disposed on a fabric layer. It is to be understood that the light source may be or may include any appropriate light source(s) such as one or more light emitting diode (LED) devices or conventional light bulbs. A light source as described herein may be any device, or any group of devices, that provide or emit light.

Figure 3:
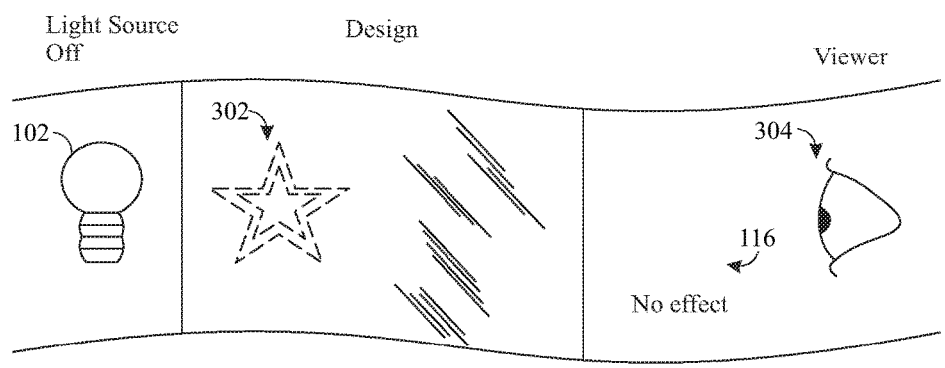
FIG. 3 schematically presents a lighted garment being observed while a light source is off, in accordance with aspects of the present disclosure.
Figure 4:
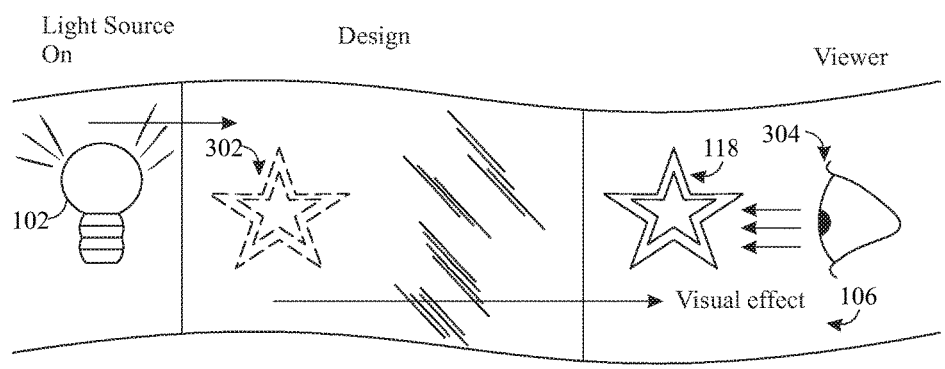
FIG. 4 schematically presents a lighted garment being observed while a light source is on, in accordance with aspects of the present disclosure.

The light source 102 may be part of a light source layer 112, the design 104 may be part of a design layer 302 (FIG. 3), and the design layer 302 may be located between the light source layer 112 and a viewer 304 such that a visual effect 106 occurs when the light source layer 112 is activated. For example the visual effect may be such that light originating from the light source layer 112 shines through the design layer 302 toward a viewer 304. Additionally or alternatively, the design layer 302 may be located behind the light source layer 112 with respect to the viewer 304, such that the design layer 302 is viewable through the light source layer 112 while the light source layer 112 illuminates the design layer 302. Therefore, the light source layer 112 may light up the design layer 302 such that light originating from the light source layer 112 reflects off the design layer 302 and passes back through the light source layer 112 to be viewed by the viewer 304.

Figure 9:
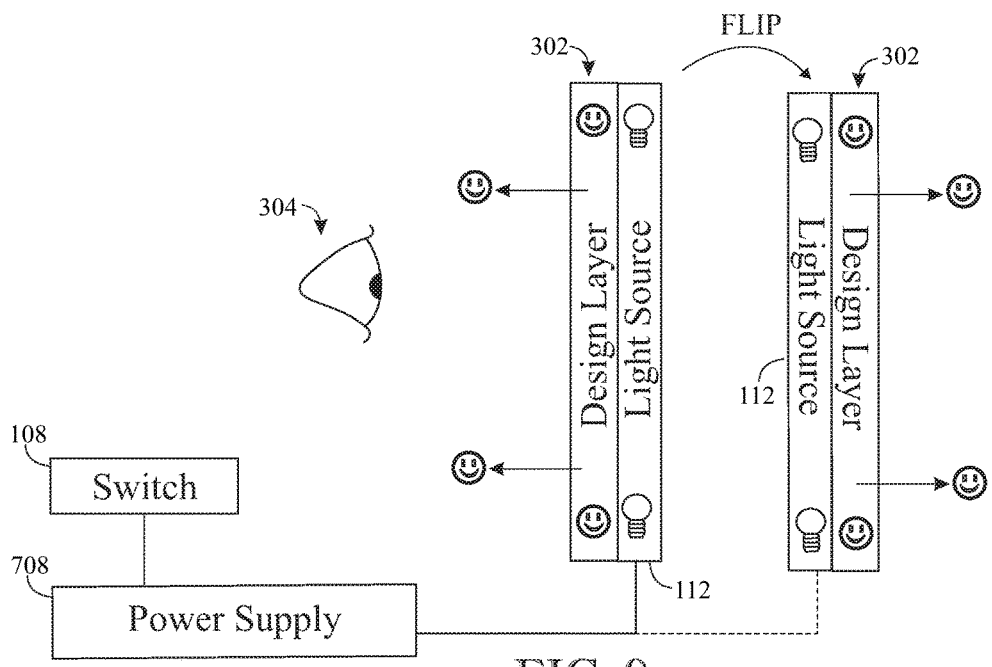
FIG. 9 schematically presents yet another example of a layering configuration of the lighting system where a design layer unidirectionally displays a design, in accordance with aspects of the present disclosure.

It is to be understood that the light source layer 112 may be physically and/or optically adjacent (e.g. an optical appearance to a viewer) to the design layer 302 such that a garment including the system 100 may be reversed to selectively show the light source layer 112 as an optical and/or physical outer layer and selectively show the design layer 302 as an optical and/or physical outer layer. For example, among other elements, FIG. 9 shows the design layer 302 being selectively reversed or inverted to be viewed in front or behind the light source 102 (e.g. light source layer 112), with respect to viewer 304.

In one example, a design of the design layer 302 is not visible through the light source layer 112, but light (e.g. individual light sources) is visible through the design layer 302. This could be accomplished by incorporating selectively transparent materials that transmit light more in one direction than an opposite direction.

Figure 10:
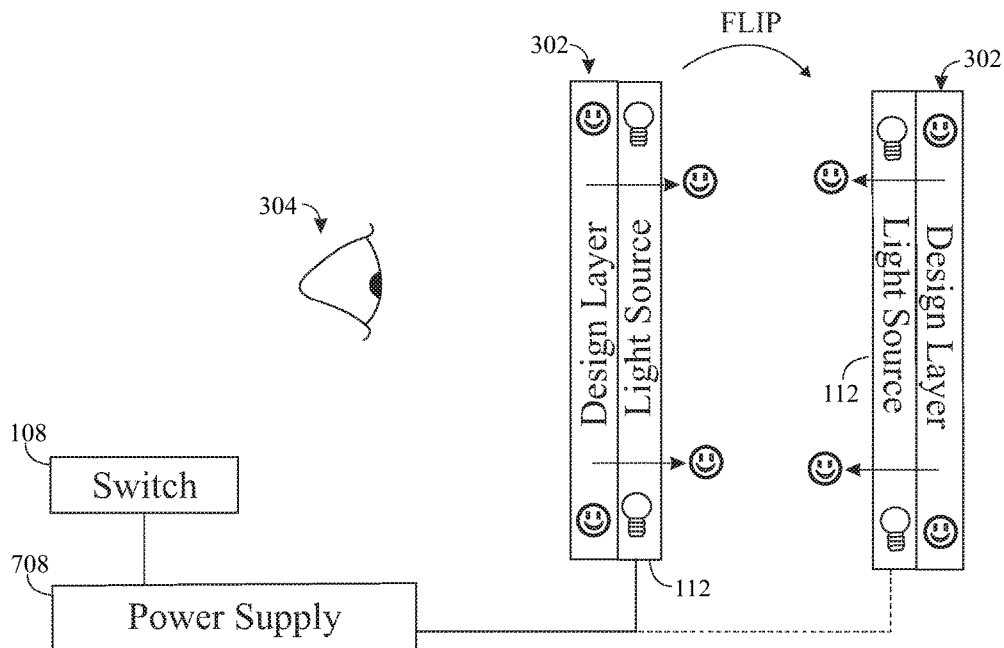
FIG. 10 schematically shows yet one more example of a layering configuration of the lighting system, where a design layer unidirectionally displays a design through a light source layer, in accordance with aspects of the present disclosure.

It is to be understood that the design layer may display a design unidirectionally. For example, a design may only be clearly visible in one direction, such that if the garment or design layer is reversed or inverted, the design is less visible from an unchanging viewpoint. FIG. 9 shows a direction in which a design is displayed, such that "happy face" designs of design layer 302 are only or mainly visible in one direction, shown by arrows. In an alternative embodiment, FIG. 10 shows the design layer only or mainly visible through a light source layer.

Figure 2:
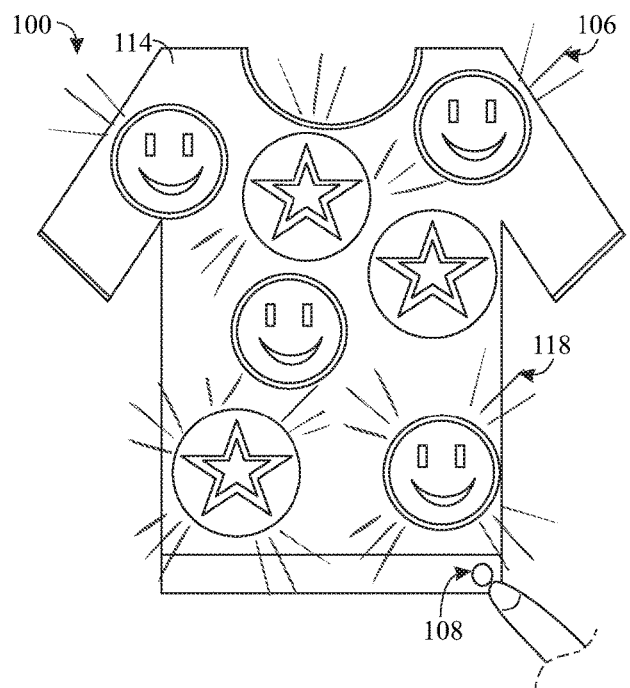
FIG. 2 presents a switch of the garment lighting system having been activated, in accordance with aspects of the present disclosure.

As shown in FIGS. 1 and 2, the design 104 may have a first visibility 116 to a viewer 304 when the light source 102 is off, and the design 104 may have a second visibility 118 when the light source 102 is turned on, where the second visibility 118 is different from the first visibility 116.

Figure 5:
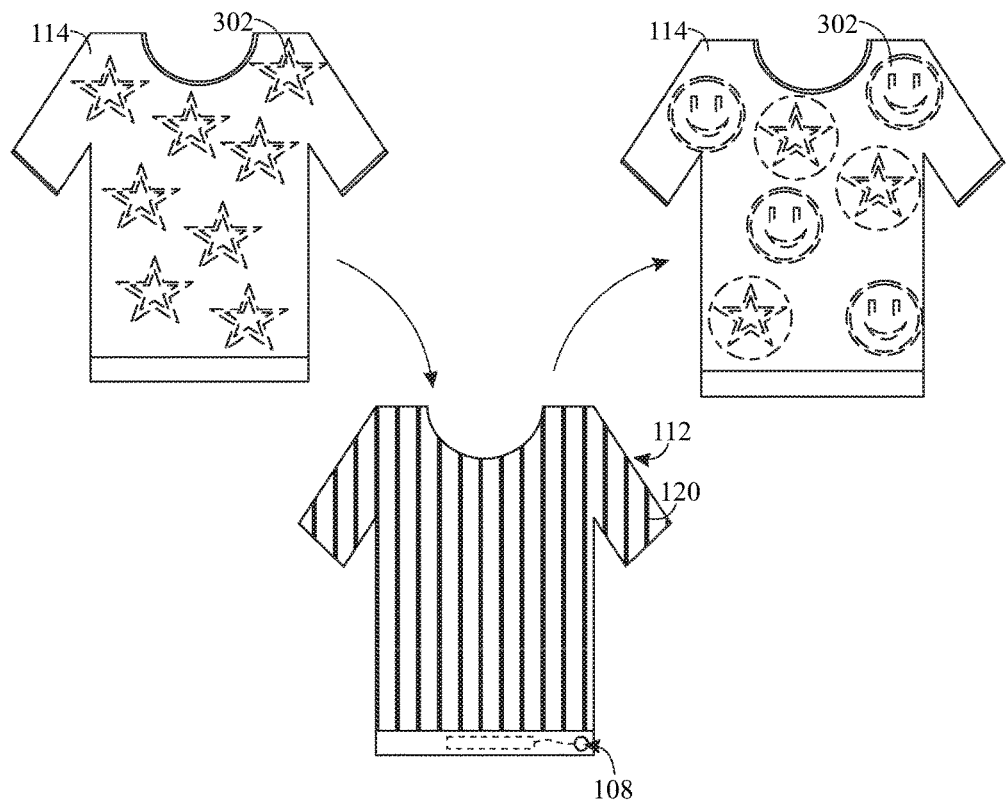
FIG. 5 presents different garment designs being swapped, in accordance with aspects of the present disclosure.
Figure 6:
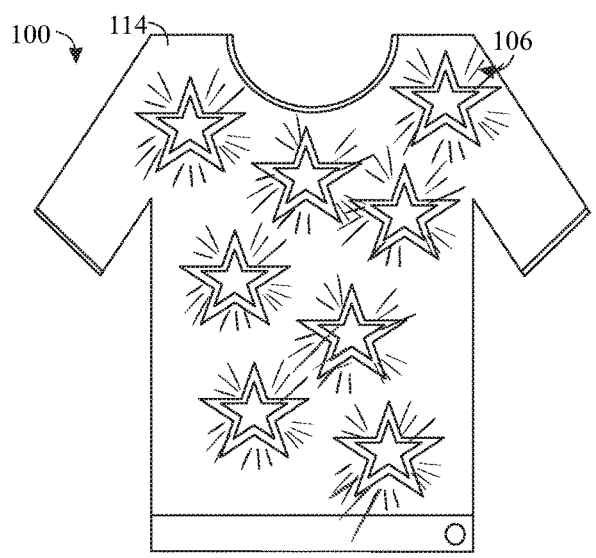
FIG. 6 presents a different garment design being illuminated, in accordance with aspects of the present disclosure.

As shown in FIGS. 5 and 6, the light source layer 112 may be separate or separable from the design layer 302 such that different design layers 302 may be used with a single light source layer 112. For example, the light source layer 112 may be provided as a vest or undershirt for illuminating or backlighting various different designs of shirts. For example, such a light source vest or under-shirt may be worn under shirt 114 (FIG. 1), where the shirt 114 may include design layer 302.

The light source layer 112 may include one or more fiber optic light emitting elements 120 (FIG. 1). The fiber optic light emitting elements 120 may be intermittently dispersed across an entire surface of a wearable garment. Alternatively, the light emitting elements 120 may be located on certain parts of a garment.

Figure 7:
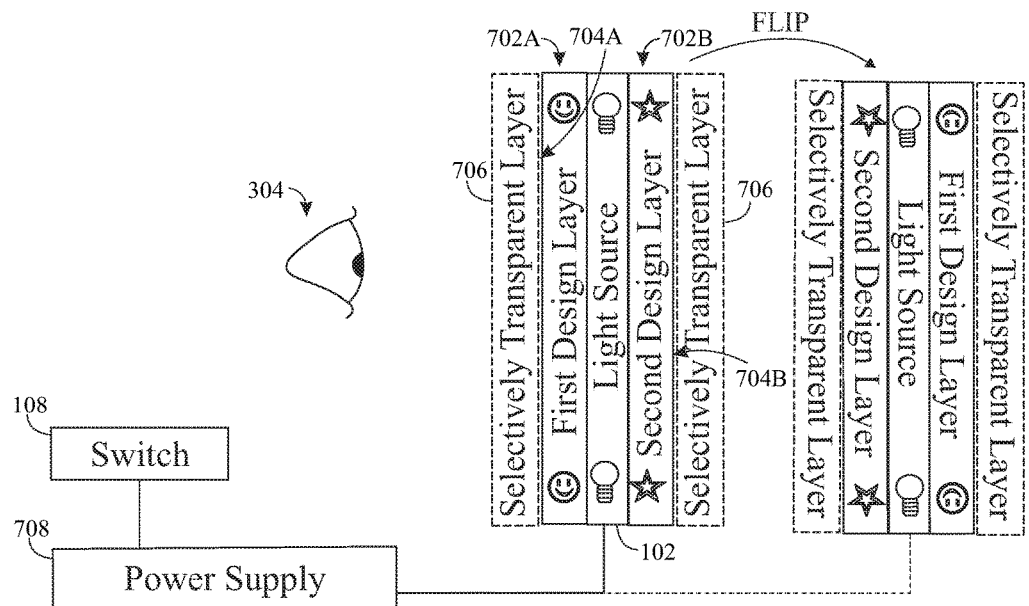
FIG. 7 schematically presents an example layering configuration of the garment lighting system, in accordance with aspects of the present disclosure.

As shown in FIG. 7, the design 104 may be part of a first design layer 702A, and the system may further include a second design layer 702B, where the light source 102 may be disposed between the first design layer 702A and the second design layer 702B such that each design layer 302 can be selectively shown to a viewer 304. For example, FIG. 7 shows the above described layers being flipped (e.g. by flipping a garment inside out) to expose or show a certain layer to a viewer.

As further shown in FIG. 7, the design 104 may be part of a first design surface 704A, and the system may further include a second design surface 704B, opposite the first design surface 704A, where the light source 102 may be disposed somewhere between the first design surface 704A and the second design surface 704B such that each design surface can be selectively shown to a viewer 304.

As shown in FIG. 7, the system may include one or more selectively transparent surfaces 706 disposable between a viewer 304 and the design surface 104 such that when the light source 102 is deactivated, visibility of the design 104 may be completely or partially blocked by the one or more selectively transparent surfaces 706 in a first visibility 116 (FIG. 1), and when the light source 102 is activated the design 104 may be visible through the one or more selectively transparent surfaces 706 in a second visibility 118 (FIG. 2), where the first visibility 116 is less than the second visibility 118. For example, an overall light intensity may be perceivable as reflected from the design 104 or design layer 302, and the light intensity for the first visibility 116 may be less than the light intensity for the second visibility 118. As another example, the selectively transparent layers 706 may appear opaque when the light source is deactivated to block some or all visibility of a design, and the selectively transparent layers 706 may appear partially or fully transparent to the design when the light source is activated. This may be achieved by selecting an appropriate material or dimensions of the selectively transparent layers 706. For example, a thin enough layer may be opaque to a viewer without a light source backlighting the layer, but when the light source is turned on, the layer may appear to have some transparency to incident light.

As further shown in FIG. 7, the light source 102 may be sandwiched between a first and second design layer 702A and 702B, and a selectively transparent layer 706 may be disposed on an outer surface of each of the design layers 702A and 702B.

Figure 8:
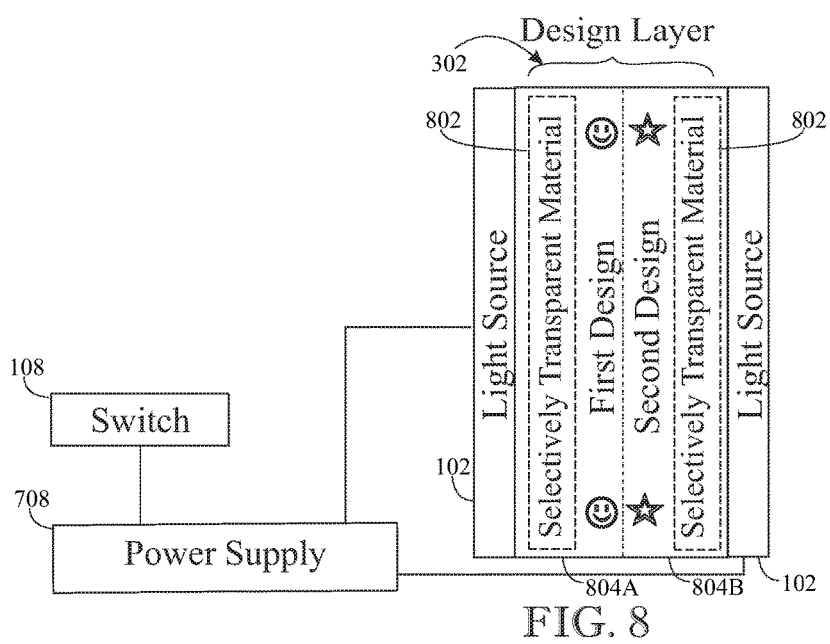
FIG. 8 schematically presents another example layering configuration of the garment lighting system, in accordance with aspects of the present disclosure.

As shown in FIGS. 7 and 8, the light source 102 may be electrically coupleable or coupled to a power supply 708 for powering the light source 102, and coupled to a switch 108 for activating or deactivating the light source 102.

As shown in FIG. 8, transparent material, or selectively transparent material 802, may be positioned in or on the design layer 302 for displaying a design 104 visible behind the transparent or selectively transparent material 802. For example, FIG. 1 shows in Detail A a transparent or selectively transparent material 802 positioned at an outer layer 122 such that a design of the design layer 302 may be visible through the transparent or selectively transparent material 802. For example, when the light source is turned on, visibility of the design may be blocked by the outer layer 122 and the design may be visible through the transparent or selectively transparent material 802. Therefore the outer layer 122 may include non-transparent material.

As shown in FIG. 8, the design layer 302 may include a first design 804A on one surface of the design layer 302, and a second design 804B on an opposite surface of the design layer 302, and a light source 102 may be positioned at each of the surfaces of the design layer 302 for illuminating each of the first design 804A and the second design 804B for the viewer 304. For example, the light sources may illuminate an outer surface of each of the design layers.

It is to be understood that any of the above design layers may each have one or more surfaces that are configured to display designs, images, logos, or patterns, and any of the above described layers may have an associated surface. Further, it is to be understood that an outer layer may be defined as a layer that is positioned toward a viewer, away from a wearer of a garment. In some examples, the light source layer may be considered an inner layer positioned near a wearer, or an outer layer positioned toward a viewer. Further, it is to be understood that any of the above layers may be omitted, and any appropriate ordering of the layers may be selected without departing from scope of the present disclosure. Further, the shown layers may not necessarily be physical layers, and may be regarded as optical layers having individual optical properties. For example, the light source and the design may be part of one sheet of fabric, positioned relative to one another as described above.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A light emitting garment system, the system comprising:
    a light source; and
    a design;
    wherein the light source is positioned relative to the design such that the light source is activatable to produce a visual effect via the design and wherein the design is part of a design layer including a first design on one surface of the design layer, and a second design on an opposite surface of the design layer, and a light source is positioned at each surface of the design layer for illuminating each of the first design and the second design.

2. The light emitting garment system of claim 1, wherein the light source and design are both fixed to a garment such that the design is visible through the light source.

3. The light emitting garment system of claim 1, wherein the light source and design are fixed to a garment such that the light source is visible through the design.

4. The light emitting garment system of claim 1, wherein the light source is fixed to a first garment, and the design is fixed to a second garment, where the first garment and the second garment are separable such that a third garment having a different design from the design of the second garment is illuminable by the light source of the first garment.

5. The light emitting garment system of claim 1, wherein the light source and design are both fixed to a garment such that the garment is a reversible garment.

6. The light emitting garment system of claim 1, wherein the light source is included in a light source layer.

7. The light emitting garment system of claim 1, wherein the design layer is configured to display the design to a viewer.

8. The light emitting garment system of claim 1, wherein the light source comprises a first light source included in a first light source layer, and a second light source in a second light source layer, where the design is located between the first light source layer and the second light source layer.

9. The light emitting garment system of claim 1, wherein the design is part of a design layer, the light source is part of a light source layer, and the light source layer is disposable between the design layer and a viewer such that a visual effect is observed through the light source layer reflecting off the design layer when the light source layer is activated.

10. The light emitting garment system of claim 1, wherein the light source comprises a plurality of fiber optic elements intermittently dispersed across an entire surface of a light source layer of a garment.

11. The light emitting garment system of claim 1, wherein the design and the light source are disposed such that each light source can be selectively outwardly disposed toward a viewer by inverting the garment.

12. The light emitting garment system of claim 1, wherein the system includes one or more selectively transparent surfaces disposable between a viewer and the design such that when the light source is deactivated, the design is visible through the one or more selectively transparent surfaces in a first visibility, and when the light source is activated, the design is visible through the one or more selectively transparent surfaces in a second visibility, where the first visibility is less than the second visibility.

13. A light emitting garment system, the system comprising:
    a light source; and
    a design;
    wherein the light source is positioned relative to the design such that the light source is activatable to produce a visual effect via the design;
    wherein the design is part of a design layer including a first design on one surface of the design layer, and a second design on an opposite surface of the design layer, and a light source is positioned at each surface of the design layer for illuminating each of the first design and the second design;
    wherein the light source and design are both fixed to a garment such that the garment is a reversible garment, wherein the first design is displayed on one side of the reversible garment and the second design is displayed on the other side of the reversible garment.

14. The light emitting garment system of claim 13, wherein the light source is included in a light source layer; and wherein the design is included in a design layer that is configured to display the design to a viewer.

15. A light emitting garment system, the system comprising:
    a light source;
    a design;
    wherein the light source is positioned relative to the design such that the light source is activatable to produce a visual effect via the design and wherein the design is part of a design layer including a first design on one surface of the design layer, and a second design on an opposite surface of the design layer, and a light source is positioned at each surface of the design layer for illuminating each of the first design and the second design;
    wherein the light source and design are both fixed to a garment such that the garment is a reversible garment and the first design is displayed on one side of the reversible garment and the second design is displayed on other side of the reversible garment;
    wherein the light source is one of a plurality of fiber optic elements;
    wherein the system includes one or more selectively transparent surfaces disposable between a viewer and the design such that when the light source is deactivated the design is visible through the one or more selectively transparent surfaces in a first visibility, and when the light source is activated the design is visible through the one or more selectively transparent surfaces in a second visibility, where the first visibility is less than the second visibility.

\* \* \* \* \*